United States Patent
Oki et al.

(10) Patent No.: US 11,411,274 B2
(45) Date of Patent: Aug. 9, 2022

(54) NONAQUEOUS ELECTROLYTE SECONDARY BATTERY

(71) Applicant: SANYO Electric Co., Ltd., Daito (JP)

(72) Inventors: Yukihiro Oki, Osaka (JP); Yoshiyuki Muraoka, Osaka (JP); Shuichi Yamashita, Tokushima (JP)

(73) Assignee: SANYO Electric Co., Ltd., Daito (JP)

( * ) Notice: Subject to any disclaimer, the term of this patent is extended or adjusted under 35 U.S.C. 154(b) by 230 days.

(21) Appl. No.: 16/642,537

(22) PCT Filed: Sep. 3, 2018

(86) PCT No.: PCT/JP2018/032646
§ 371 (c)(1),
(2) Date: Feb. 27, 2020

(87) PCT Pub. No.: WO2019/049833
PCT Pub. Date: Mar. 14, 2019

(65) Prior Publication Data
US 2020/0185669 A1 Jun. 11, 2020

(30) Foreign Application Priority Data
Sep. 6, 2017 (JP) .............................. JP2017-171007

(51) Int. Cl.
H01M 10/04 (2006.01)
H01M 10/0569 (2010.01)
H01M 50/183 (2021.01)

(52) U.S. Cl.
CPC ..... *H01M 50/183* (2021.01); *H01M 10/0422* (2013.01); *H01M 10/0569* (2013.01); *H01M 2300/0028* (2013.01)

(58) Field of Classification Search
None
See application file for complete search history.

(56) References Cited

U.S. PATENT DOCUMENTS

2002/0106559 A1* 8/2002 Takahashi ............... H01G 9/10
429/185
2007/0072074 A1* 3/2007 Yamamoto ........ H01M 10/0567
429/200
2008/0226982 A1* 9/2008 Schubert .............. C09K 3/1012
429/185

FOREIGN PATENT DOCUMENTS

JP 55-143776 A 11/1980
JP 10-55789 A 2/1998
(Continued)

OTHER PUBLICATIONS

JPH1055789 English translation. Maeda et al. Japan. Feb. 24, 1998. (Year: 1998).*

(Continued)

*Primary Examiner* — Christopher P Domone
(74) *Attorney, Agent, or Firm* — WHDA, LLP

(57) ABSTRACT

An object of the present disclosure is to provide a high-endurance and long-life nonaqueous electrolyte secondary battery including a battery case having sealing performance unlikely to be degraded. A nonaqueous electrolyte secondary battery according to an aspect of the present disclosure includes a closed-end cylindrical outer can, a sealing body that closes an opening of the outer can, a resin gasket disposed between the outer can and the sealing body, a sealing member interposed between the outer can and the gasket, and a nonaqueous electrolyte. The sealing member has a multilayer structure including a first sealing member layer, the main constituent of which is one selected from butadiene rubber, urethane rubber, silicone rubber, chloroprene rubber, and isoprene rubber, and a second sealing member layer, the main constituent of which is one selected from ethylene propylene rubber, ethylene propylene diene rubber, and fluoro rubber.

6 Claims, 2 Drawing Sheets

(56) References Cited

FOREIGN PATENT DOCUMENTS

| | | | |
|---|---|---|---|
| JP | 2004-79355 A | | 3/2004 |
| JP | 2008204839 | * | 9/2008 |
| JP | 2008-235081 A | | 10/2008 |
| JP | 2009-93799 A | | 4/2009 |
| JP | 2010-15784 A | | 1/2010 |
| JP | 2011-210412 A | | 10/2011 |
| WO | 2013/176024 A1 | | 11/2013 |

OTHER PUBLICATIONS

JP 2008-235081 English translation. Tokuhira. Oct. 2, 2008 (Year: 2008).*
JP 2008-204839 English translation. Nakai et al. Sep. 4, 2008 (Year: 2008).*
International Search Report dated Oct. 9, 2018, issued in counterpart International Application No. PCT/JP2018/032646 (2 pages).

* cited by examiner

NONAQUEOUS ELECTROLYTE SECONDARY BATTERY

TECHNICAL FIELD

The present disclosure relates to a nonaqueous electrolyte secondary battery.

BACKGROUND ART

Battery properties of nonaqueous electrolyte secondary batteries, such as lithium ion batteries, are degraded by ingress of moisture into the batteries. Therefore, to provide high-endurance and long-life nonaqueous electrolyte secondary batteries, it is important to improve the sealing performance of the battery case. When a closed-end cylindrical outer can and a sealing body are used for a battery case, the opening of the outer can is closed by using the sealing body for the battery case to have reliable sealing performance. For example, PTL 1 and PTL 2 each disclose a nonaqueous electrolyte secondary battery including a battery case having a reliable sealing performance. In such a battery case, a resin gasket is disposed between the outer can and the sealing body, and furthermore, a sealing member, the main component of which is butadiene rubber (BR), is interposed between the gasket and the outer can. Such a sealing structure, which is a durability-improving technology that has been inherited, has been widely traded in the market.

On the other hand, BR may deteriorate due to a chemical reaction between BR and a substance in the battery, such as an electrolyte solution, thereby degrading the sealing performance of the battery case. In particular, regarding batteries exposed to high temperatures, BR is likely to deteriorate, thereby easily leading to the degradation of sealing performance. As a sealing member having high chemical resistance and low reactivity with an electrolyte solution, a sealing member, the main constituent of which is ethylene propylene diene rubber (EPDM), is proposed (e.g., see PTL 3).

CITATION LIST

Patent Literature

PTL 1: Japanese Published Unexamined Patent Application No. 10-55789
PTL 2: Japanese Published Unexamined Patent Application No. 2011-210412
PTL 3: International Publication No. 2013/176024

SUMMARY OF INVENTION

Technical Problem

A sealing member containing EPDM can suppress degradation of sealing performance due to contact with an electrolyte solution; however, EPDM has lower rebound resilience than BR, and thus, when an impact force applied to a battery due to, for example, vibration or dropping deforms a gasket and the sealing member, sealing performance may be degraded. In other words, there is room for improvement in impact-force resistance of a battery including a sealing member containing EPDM. An object of the present disclosure is to provide a high-endurance and long-life nonaqueous electrolyte secondary battery including a battery case having sealing performance unlikely to be degraded.

Solution to Problem

A nonaqueous electrolyte secondary battery according to an aspect of the present disclosure includes a closed-end cylindrical outer can, a sealing body that closes an opening of the outer can, a resin gasket disposed between the outer can and the sealing body, a sealing member interposed between the outer can and the gasket, and a nonaqueous electrolyte, wherein the sealing member has a multilayer structure including a first sealing member layer, the main constituent of which is one selected from butadiene rubber, urethane rubber, silicone rubber, chloroprene rubber, and isoprene rubber, and a second sealing member layer, the main constituent of which is one selected from ethylene propylene rubber, ethylene propylene diene rubber, and fluoro rubber.

Advantageous Effects of Invention

According to an aspect of the present disclosure, a high-endurance and long-life nonaqueous electrolyte secondary battery including a battery case having sealing performance unlikely to be degraded can be provided. The nonaqueous electrolyte secondary battery according to the present disclosure has high vibration resistance, high dropping resistance, and high electrolyte-solution resistance. Thus, for example, if the battery is exposed to high temperatures for a long term, or if a large impact force is applied to the battery due to, for example, dropping, sealing performance of the battery case can be maintained.

DESCRIPTION OF EMBODIMENTS

Figure 1:
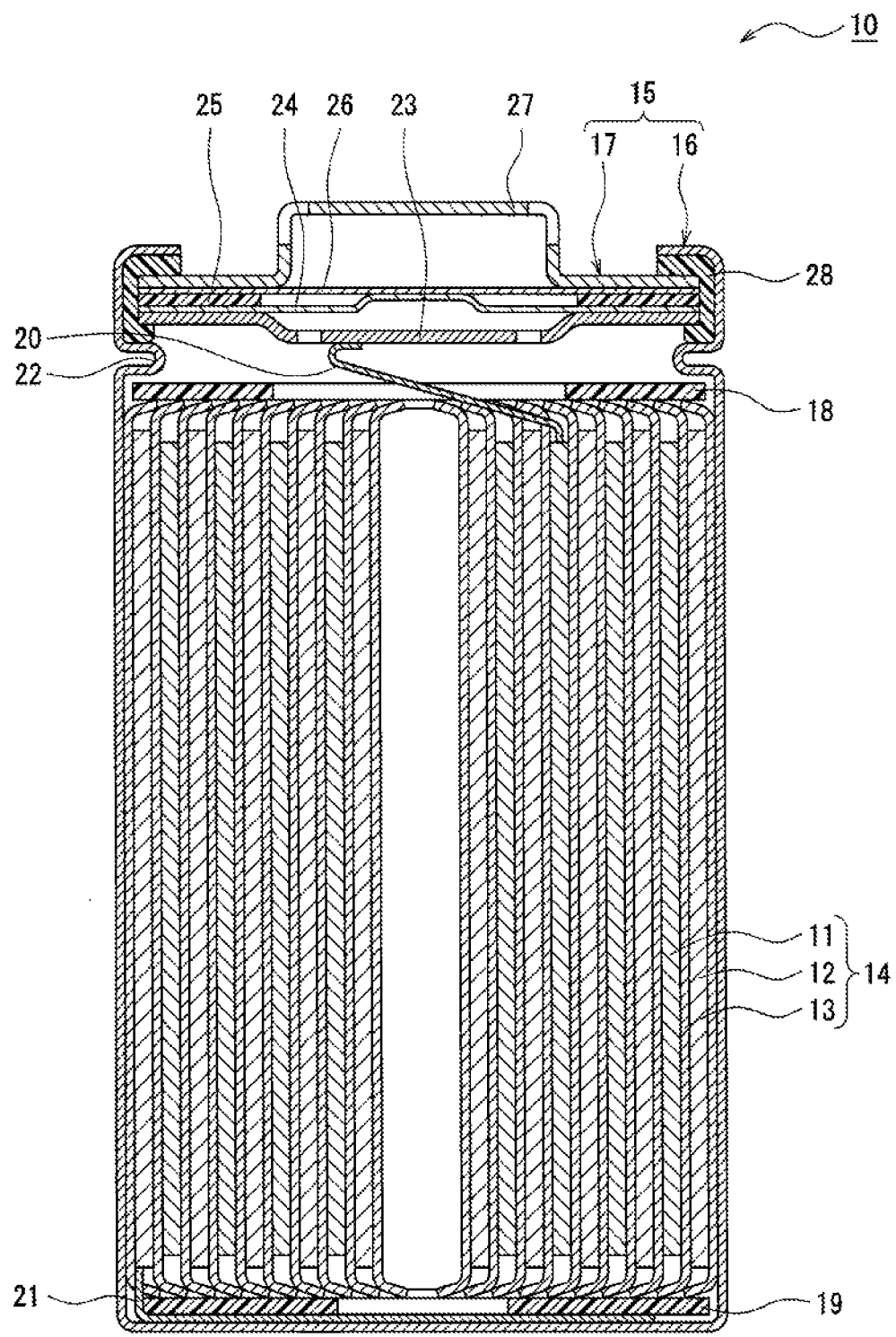
FIG. 1 is a cross-sectional view of an exemplary nonaqueous electrolyte secondary battery according to an embodiment.

As described above, regarding nonaqueous electrolyte secondary batteries, such as lithium ion batteries, it is important to provide a high-endurance and long-life product including a battery case having sealing performance unlikely to be degraded. When long-time endurance is needed at high temperatures for, for example, electricity storage, increasing the amount of lithium hexafluorophosphate ($LiPF_6$), which is an electrolyte salt, or using fluoroethylene carbonate (FEC) as a solvent constituent is effective to prolong the cycle life of a battery. However, an excessive amount of $LiPF_6$ leads to generation of compounds, such as HF or $PF_5$. Such a compound promotes degradation of butadiene rubber (BR) of a sealing member interposed between a gasket and an outer can. Regarding FEC, decomposition thereof generates HF, and BR dissolves in FEC, which is a solvent. The acid and FEC promote the degradation of BR.

For a sealing member having high chemical resistance and low reactivity with an electrolyte solution, ethylene propylene diene rubber (EPDM) is known; however, as described above, EPDM has lower rebound resilience than BR. Therefore, in a case in which a sealing member, the main constituent of which is EPDM, is used, when an impact force applied to a battery due to, for example, vibration or dropping deforms a gasket and the sealing member, sealing performance of a battery case may be degraded.

The inner pressure of a nonaqueous electrolyte secondary battery is typically higher than the outer atmospheric pressure due to vaporization of an electrolyte solution constituent. This prevents ingress of a substance, such as oxygen or moisture, from the outside. Thus, if degradation of the sealing member decreases sealing performance of a battery case and the inner pressure becomes substantially the same as the outer atmospheric pressure, ingress of, for example, moisture into the battery is likely to occur, thereby leading to degradation of battery characteristics.

The present inventors diligently carried out studies to develop a high-endurance and long-life nonaqueous electrolyte secondary battery including a battery case having sealing performance unlikely to be degraded, and as a result, succeeded to solve the problem by using a multilayer-structure sealing member including the first sealing member layer and the second sealing member layer. The first sealing member layer, the main constituent of which is a resin having high rebound resilience, such as BR, and the second sealing member layer, the main constituent of which is a resin having high electrolyte-solution resistance, such as EPDM, enable the sealing structure to have vibration resistance, dropping resistance, and electrolyte-solution resistance and to be used for a long term for, for example, electricity storage applications.

In the nonaqueous electrolyte secondary battery according to the present disclosure, when FEC is used for a certain application, and if a strong impact force is applied to the battery due to, for example, dropping, the sealing member is unlikely to be degraded, thereby maintaining good sealing performance of the battery case.

Hereinafter, an exemplary embodiment will be described in detail. Hereinafter, a cylindrical battery including an electrode body 14 having a winding structure accommodated in a cylindrical battery case 15 will be described; however, the structure of the electrode body is not limited to a winding structure and may be a multilayer structure in which plural positive electrodes and plural negative electrodes are alternately stacked on each other with a separator disposed therebetween. The shape of the battery case is not limited to a cylindrical shape and may be, for example, a prismatic shape (prismatic battery) or a coin shape (coin battery).

In the present description, for convenience of description, the sealing-body-17 side of the battery case 15 is referred to as "upper side", and the side near the bottom of an outer can 16 is referred to as "lower side".

FIG. 1 is a cross-sectional view of an exemplary nonaqueous electrolyte secondary battery 10 according to an embodiment. As illustrated in FIG. 1, the nonaqueous electrolyte secondary battery 10 includes the electrode body 14, a nonaqueous electrolyte (not illustrated), and the battery case 15 that accommodates the electrode body 14 and the nonaqueous electrolyte. The electrode body 14 has a winding structure in which a positive electrode 11 and a negative electrode 12 are wound together with a separator 13 disposed therebetween. The battery case 15 includes the closed-end cylindrical outer can 16 and a sealing body 17 that closes the opening of the outer can 16. The nonaqueous electrolyte secondary battery 10 includes a resin gasket 28 disposed between the outer can 16 and the sealing body 17.

An insulating plate 18 is disposed adjacent to the upper side of the electrode body 14, and an insulating plate 19 is disposed adjacent to the lower side of the electrode body 14.

In the example in FIG. 1, a positive electrode lead 20 fixed to the positive electrode 11 extends through the through hole of the insulating plate 18 to the sealing-body-17 side, and a negative electrode lead 21 fixed to the negative electrode 12 extends beside the insulating plate 19 to the side near the bottom of the outer can 16. The positive electrode lead 20 is connected to the lower surface of a filter 23, which is the bottom plate of the sealing body 17, by, for example, welding. A cap 27, which is the top plate of the sealing body 17, is electrically connected to the filter 23 and functions as the positive electrode terminal. The negative electrode lead 21 is connected to the inner surface of the bottom of the outer can 16 by, for example, welding. The outer can 16 functions as the negative electrode terminal.

The outer can 16 may be a closed-end cylindrical metal casing. As described above, the gasket 28 is disposed between the outer can 16 and the sealing body 17. This seals the inner space of the battery case 15. A sealing member 30 is interposed between the outer can 16 and the gasket 28 (see FIG. 2 described later). The outer can 16 has a groove portion 22 that supports the sealing body 17. The groove portion 22 may be formed by pressing the side surface of the outer can 16 from the outside. The groove portion 22 is preferably formed in an annular shape in a circumferential direction of the outer can 16. The upper surface of the groove portion 22 supports the sealing body 17. The upper end portion of the outer can 16 is bent inside and crimped to the peripheral portion of the sealing body 17.

The sealing body 17 has a structure in which the filter 23, a lower valve body 24, an insulation member 25, an upper valve body 26, and the cap 27 are sequentially stacked on each other from the electrode-body-14 side. Each member of the sealing body 17 has, for example, a disk shape or a ring shape. The members except the insulation member 25 are electrically connected to each other. The center portion of the lower valve body 24 and the center of the upper valve body 26 are connected to each other. The insulation member 25 is interposed between the peripheral portions of the lower valve body 24 and the upper valve body 26. An increase in the inner pressure of the battery due to abnormal heat generation causes the lower valve body 24 to deform so as to push up the upper valve body 26 toward the cap 27, and to fracture, thereby interrupting the current path between the lower valve body 24 and the upper valve body 26. A further increase in the inner pressure fractures the upper valve body 26, thereby discharging gas from an opening of the cap 27.

Figure 2:
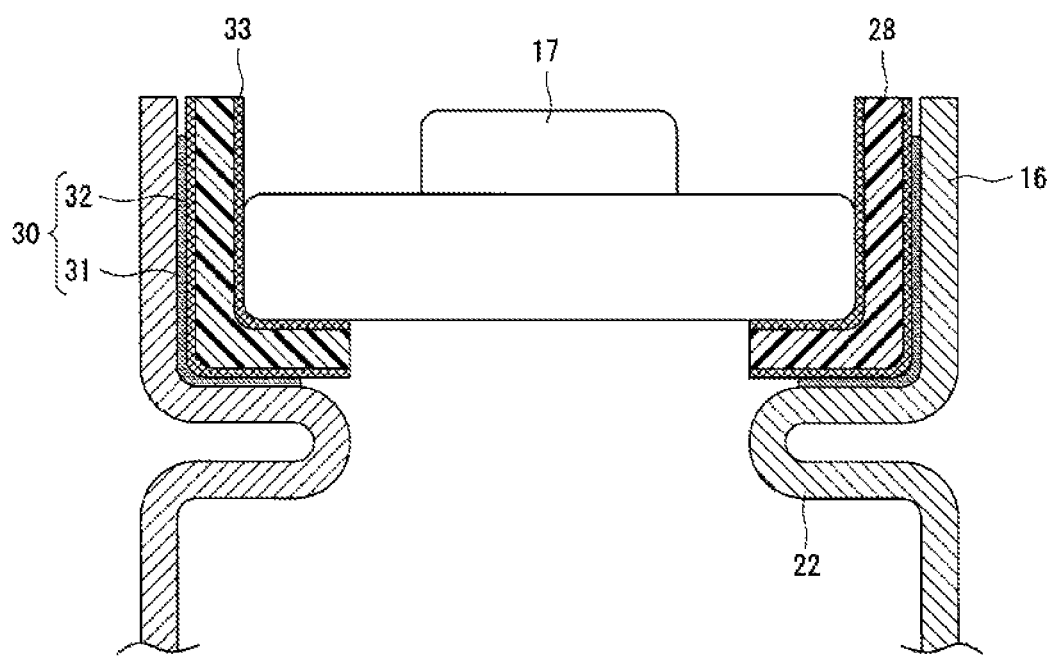
FIG. 2 is a diagram for describing a sealing structure of an exemplary battery case according to the embodiment.

Hereinafter, with reference to FIG. 2, each member of the nonaqueous electrolyte secondary battery 10 will be described. In particular, the gasket 28 and the sealing member 30, which form the sealing structure of the battery case 15, will be described in detail. FIG. 2 is a cross-sectional view of the sealing structure before the outer can 16 is crimped.

[Positive Electrode]

The positive electrode includes a positive electrode current collector that may be made of a metal foil and a positive electrode mixture layer formed on such a current collector. For the positive electrode current collector, a foil of a metal that is stable within the positive electrode potential range, such as aluminum, or, for example, a film having a surface on which such a metal is disposed may be used. The positive electrode mixture layer preferably contains a positive electrode active material, a conductive material, such as carbon black or acetylene black, and a binder, such as polyvinylidene fluoride (PVdF). The positive electrode active material may be a lithium metal composite oxide containing a metal element, such as Co, Mn, Ni, or Al.

[Negative Electrode]

The negative electrode includes a negative electrode current collector that may be made of a metal foil and a negative electrode mixture layer formed on such a current collector. For the negative electrode current collector, a foil of a metal that is stable within the negative electrode potential range, such as copper, or, for example, a film having a surface on which such a metal is disposed may be used. The negative electrode mixture layer preferably contains a negative electrode active material and a binder, such as styrene-butadiene rubber (SBR). The negative electrode active material may be any material that can bind and release lithium ions reversibly. Examples of such a material include carbon materials, such as natural graphite and synthetic graphite, metals that can be alloyed with Li, such as silicon (Si) and tin (Sn), and oxides containing a metal element, such as Si or Sn.

[Separator]

For the separator, a porous sheet having ion permeability and insulating properties is used. Specific examples of the porous sheet include microporous thin films, woven fabrics, and nonwoven fabrics. The material of the separator is preferably, for example, an olefin resin, such as polyethylene or polypropylene, or cellulose. The separator may have a monolayer structure or a multilayer structure.

[Nonaqueous Electrolyte]

The nonaqueous electrolyte contains a nonaqueous solvent and an electrolyte salt dissolved in the nonaqueous solvent. As described above, in particular, the nonaqueous electrolyte of a battery used in a high-temperature environment preferably contains FEC. The amount of FEC relative to the volume of the nonaqueous solvent is preferably 2 to 40 volume % and more preferably 5 to 20 volume %. When the amount of FEC is within the above range, good cycle characteristics are likely to be maintained during use in low- to high-temperature environments.

Examples of FEC include 4-fluoroethylene carbonate (monofluoroethylene carbonate), 4,5-difluoroethylene carbonate, 4,4-difluoroethylene carbonate, 4,4,5-trifluoroethylene carbonate, and 4,4,5,5-tetrafluoroethylene carbonate. Among such compounds, 4-fluoroethylene carbonate is particularly preferable.

For the nonaqueous solvent, at least one of fluorine-based solvents other than FEC and non-fluorine-based solvents is preferably used in combination. Examples of the nonaqueous solvent other than FEC include cyclic carbonates, linear carbonates, cyclic ethers, linear ethers, carboxylic acid esters, such as methyl acetate, ethyl acetate, propyl acetate, methyl propionate, ethyl propionate, and γ-butyrolactone, nitriles, such as acetonitrile, amides, such as dimethylformamide, and halogen-substituted derivatives in which hydrogens of the above compounds are substituted with halogen atoms, such as fluorine. Such compounds may be used alone or in a combination of two or more.

Examples of the above cyclic carbonates include ethylene carbonate (EC), propylene carbonate, and butylene carbonate. Among such compounds, EC is particularly preferable. Examples of the above linear carbonates include dimethyl carbonate (DMC), ethyl methyl carbonate (EMC), diethyl carbonate, methyl propyl carbonate, ethyl propyl carbonate, and methyl isopropyl carbonate. Among such compounds, DMC and EMC are particularly preferable.

Examples of the above cyclic ethers include 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineol, and crown ether. Examples of the linear ethers include 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl ether.

A preferable exemplary nonaqueous solvent is a combination of FEC and a non-fluorine-based solvent containing at least one of EC, EMC, and DMC. In such a case, the amount of EC relative to the volume of the nonaqueous solvent is preferably 5 to 20 volume %. Relative to the volume of the nonaqueous solvent, the amount of EMC and the amount of DMC are each preferably 20 to 50 volume %. The nonaqueous electrolyte may contain an additive, such as vinylene carbonate (VC), ethylene sulfite (ES), cyclohexylbenzene (CHB), or a denaturant of such compounds.

The electrolyte salt is preferably a lithium salt. Examples of the lithium salt include $LiBF_4$, $LiClO_4$, $LiPF_6$, $LiAsF_6$, $LiSbF_6$, $LiAlCl_4$, $LiSCN$, $LiCF_3SO_3$, $LiCF_3CO_2$, $Li(P(C_2O_4)F_4)$, $LiPF_{6-x}(C_nF_{2n+1})_x$ (1<x<6, n equals 1 or 2), $LiB_{10}Cl_{10}$, $LiCl$, $LiBr$, $LiI$, chloroborane lithium, lithium lower aliphatic carboxylate, boric acid salts, such as $Li_2B_4O_7$ and $Li(B(C_2O_4)$ $F_2)$, and imide salts, such as $LiN(SO_2CF_3)_2$ and $LiN(C_3F_{2l+1}SO_2)(C_mF_{2m+1}SO_2)$ (1 and m are each an integer of 1 or higher). Such lithium salts may be used alone or in a combination of two or more. Among such compounds, from the viewpoint of properties, such as ionic conductivity and electrochemical stability, $LiPF_6$ is preferably used. The concentration of the lithium salt may be 0.8 to 1.8 mol per liter of the nonaqueous solvent.

As illustrated in FIG. 2, the nonaqueous electrolyte secondary battery 10 includes the sealing member 30 interposed between the outer can 16 and the gasket 28. The sealing member 30 has a multilayer structure including a first sealing member layer 31 and a second sealing member layer 32, which each have a different main constituent. In the example in FIG. 2, the sealing member 30 having a two-layer structure is disposed between the outer can 16 and the gasket 28. The sealing member 30 may have a multi-layer structure having three or more layers. In such a case, the sealing member 30 may include a third sealing member layer.

The nonaqueous electrolyte secondary battery 10 includes a sealing member 33 interposed between the sealing body 17 and the gasket 28. In the example in FIG. 2, the sealing member 33 has a monolayer structure and may have a multi-layer structure having two or more layers. The sealing member 33 may include the first sealing member layer 31 and the second sealing member layer 32. Compared with the sealing member 30, the sealing member 33 is unlikely to be in contact with the electrolyte solution. The sealing member 33 has the same structure as the sealing member 30, and thus, sealing performance is expected to be further improved.

The gasket 28 is a ring-shape resin member inserted into a portion (upper end portion) at the opening of the outer can 16. The gasket 28 closes, with the sealing members 30 and 33, the gap between the outer can 16 and the sealing body 17 and is included in the sealing structure of the battery case 15. The gasket 28 prevents an electrical contact between the outer can 16 and the sealing body 17, and reliable insulating properties are exhibited. The gasket 28 contains an olefin resin that contains, for example, polypropylene as the main constituent.

The first sealing member layer 31 can be formed by applying a liquid composition in which the constituent material of the first sealing member layer 31 is dissolved or dispersed to the inner surface of the outer can 16 to form a coating and drying the coating. In the same manner, the second sealing member layer 32 can be formed by applying a liquid composition in which the constituent material of the second sealing member layer 32 is dissolved or dispersed to the surface of the gasket 28 to form a coating and drying the coating. The thickness of the first sealing member layer 31 and the second sealing member layer 32 is not particularly limited. An exemplary preferable thickness is 5 to 50 μm.

The first sealing member layer 31 preferably contains a material having vibration resistance and dropping resistance. Rubber having a carbon-carbon double bond in the main chain or rubber having high rebound resilience is appropriate for the constituent material of the first sealing member layer 31. Specifically, the main constituent of the first sealing member layer 31 is one selected from butadiene rubber (BR), urethane rubber, silicone rubber, chloroprene rubber, and isoprene rubber. Among the above rubbers, considering properties, such as solvent resistance, fluorine resistance, ease of coating, and rebound resilience, the main constituent of the first sealing member layer 31 is preferably BR.

On the other hand, the second sealing member layer 32 preferably contains a material having resistance to an electrolyte solution constituent, such as FEC, and to an acid constituent, such as HF, that is generated due to decomposition of an electrolyte solution constituent. Rubber having no or a few C—C double bonds in the main chain or low-polar rubber is appropriate for the constituent material of the second sealing member layer 32. Specifically, the main constituent of the second sealing member layer 32 is one selected from ethylene propylene rubber, ethylene propylene diene rubber (EPDM), and fluoro rubber. Among the above rubbers, considering, for example, solvent resistance, fluorine resistance, ease of coating, and the material cost, the main constituent of the second sealing member layer 32 is preferably EPDM.

Herein, the main constituent refers to a constituent contained in the largest amount in the material of a sealing member layer. When the main constituent of the first sealing member layer 31 is BR, the proportion of BR in the constituent material of the first sealing member layer 31 is preferably 50 mass % or more, more preferably 70 mass % or more, and particularly preferably 90 mass % or more. The first sealing member layer 31 may contain substantially only BR. When the main constituent of the second sealing member layer 32 is EPDM, the proportion of EPDM in the constituent material of the second sealing member layer 32 is preferably 50 mass % or more, more preferably 70 mass % or more, and particularly preferably 90 mass % or more. The second sealing member layer 32 may contain substantially only EPDM.

The first sealing member layer 31 and the second sealing member layer 32 may each contain an additive, such as an antioxidant, a dispersant, a thermal aging inhibitor, a flex-cracking inhibitor, or an ozone degradation inhibitor. The first sealing member layer 31 and the second sealing member layer 32 may each contain, for example, carbon black or acetylene black.

The sealing member 30 has a multilayer structure in which the first sealing member layer 31, the main constituent of which is, for example, BR, and the second sealing member layer 32, the main constituent of which is, for example, EPDM, are sequentially disposed from the outer-can-16 side. In other words, the first sealing member layer 31 is formed on the inner surface of the outer can 16, and the second sealing member layer 32 is formed on the surface of the gasket 28. The first sealing member layer 31 is formed in an annular shape along the inner surface (inner peripheral surface) of the outer can 16 in the upper end portion of the closed-end cylindrical outer can 16. The first sealing member layer 31 is preferably formed over a wide range of a region of the inner surface of the outer can 16 that is adjacent to the gasket 28. For example, the first sealing member layer 31 is formed from the upper surface of the groove portion 22 to the upper end of the outer can 16 or to a portion close to the upper end.

The second sealing member layer 32 is preferably formed on an entire surface of the gasket 28 that faces the outer can 16. The sealing member 33 is formed on a surface of the gasket 28 that faces the sealing body 17. From the viewpoint of, for example, productivity, the material of the second sealing member layer 32 is also used for the sealing member 33.

In the example in FIG. 2, the gasket 28 has a larger dimension than the first sealing member layer 31. The second sealing member layer 32 formed on the gasket 28 is in close contact with an entire surface (inner surface) of the first sealing member layer 31 that faces away from the outer can 16. In such a way, regarding the surface of the first sealing member layer 31, the entire surface on which the second sealing member layer 32 is stacked is covered with the second sealing member layer 32. Thus, the first sealing member layer 31, the main constituent of which is, for example, BR, is unlikely to be affected by the electrolyte solution, thereby suppressing degradation of the first sealing member layer 31.

The sealing member 30 has a multilayer structure including the first sealing member layer 31 having high rebound resilience, the main constituent of which is, for example, BR, and the second sealing member layer 32 having high electrolyte-solution resistance, the main constituent of which is, for example, EPDM. Thus, high vibration resistance, dropping resistance, and electrolyte-solution resistance are exhibited. Therefore, in the nonaqueous electrolyte secondary battery 10 including the sealing member 30, when FEC is used for a certain application, and if a strong impact force is applied to the battery due to, for example, dropping, the sealing member 30 is unlikely to be degraded, thereby maintaining good sealing performance.

The sealing member 30 may have a multilayer structure in which the second sealing member layer 32, the main constituent of which is, for example, EPDM, and the first sealing member layer 31, the main constituent of which is, for example, BR, are sequentially disposed from the outer-can-16 side. In such a case, the effect exhibited in the exemplary structure in FIG. 2 can also be exhibited.

EXAMPLES

Hereinafter, with reference to Examples, the present disclosure will be further described. The present disclosure is not limited to such Examples.

Example 1

[Production of Positive Electrode]
Lithium-nickel-cobalt-manganese composite oxide particles represented by $LiNi_{0.5}Co_{0.2}Mn_{0.3}O_2$ was used as the positive electrode active material. The positive electrode active material, acetylene black, and PVdF were mixed together at a mass ratio of 95:2:3, and an appropriate amount of N-methyl-2-pyrrolidone (NMP) was further added to prepare a positive electrode mixture slurry. Next, the positive electrode mixture slurry was applied to each surface of the long positive electrode current collector made of an aluminum foil to form a coating. Heat treatment at 100° C. to 150° C. was performed in a dryer to dry the coating. Thereafter, the coating (positive electrode mixture layer) was rolled by using a roll press machine such that the electrode plate has a thickness of 150 μm. Then, the long current collector having the positive electrode mixture layer on each surface was cut to obtain a positive electrode having a predetermined electrode size.

[Production of Negative Electrode]

Graphite was used as the negative electrode active material. The negative electrode active material, SBR, and sodium carboxymethyl cellulose (CMC-Na) were mixed together at a weight ratio of 96:2:2, and an appropriate amount of water was further added to prepare a negative electrode mixture slurry. Next, the negative electrode mixture slurry was applied to each surface of the long negative electrode current collector made of a copper foil to form a coating. Heat treatment at 100° C. to 150° C. was performed in a dryer to dry the coating. Thereafter, the coating (negative electrode mixture layer) was rolled by using a roll press machine such that the electrode plate has a thickness of 150 μm. Then, the long current collector having the negative electrode mixture layer on each surface was cut to obtain a negative electrode having a predetermined electrode size.

[Preparation of Nonaqueous Electrolyte Solution]

LiPF$_6$ was dissolved in a solvent in which fluoroethylene carbonate (FEC), ethylene carbonate (EC), ethyl methyl carbonate (EMC), and dimethyl carbonate (DMC) were mixed together at a volume ratio of 10:10:40:40, to have a concentration of 1.4 mol/l to prepare a nonaqueous electrolyte solution.

[Production of Battery]

An aluminum positive electrode lead was fixed to the positive electrode, and a nickel negative electrode lead was fixed to the negative electrode. The positive electrode and the negative electrode were spirally wound with a polyethylene separator of 16 μm in thickness disposed therebetween, to produce a wound-type electrode body. The electrode body was accommodated in a closed-end cylindrical outer can having a sealing member layer A formed in the area to which the gasket is adjacent. After the nonaqueous electrolyte solution was poured, the opening of the outer can was closed by using a sealing body and a gasket having the surface covered with a sealing member layer B. In this way, a cylindrical secondary battery with an outer diameter of 18 mm and a height of 65 mm (18650 type, battery capacity 2300 mAh) was produced.

In Example 1, a sealing member containing butadiene rubber (BR) and a sealing member containing ethylene propylene diene rubber (EPDM) were respectively used as the sealing member layer A and the sealing member layer B to produce the above secondary battery. The sealing member layer A was formed by applying a liquid composition in which 13 parts by mass of BR and 0.5 parts by mass of carbon black were dispersed in xylene to the inner surface of the outer can to form a coating, and thereafter drying the coating. In the same manner, the sealing member layer B was formed by applying a liquid composition in which 15 parts by mass of EPDM and 0.7 parts by mass of carbon black were dispersed in xylene to the surface of the gasket to form a coating, and thereafter drying the coating. The sealing member layer A had a thickness of about 30 μm, and the sealing member layer B had a thickness of about 30 μm. The entire sealing member layer A was covered with the sealing member layer B.

Example 2

A secondary battery in Example 2 was produced in the same manner as that in Example 1, except that the sealing member containing EPDM was used as the sealing member layer A and that the sealing member containing BR was used as the sealing member layer B.

Comparative Example 1

A secondary battery in Comparative Example 1 was produced in the same manner as that in Example 1, except that the sealing member containing BR was used as the sealing member layer B (i.e., the sealing member layers A and B each contain BR as the main constituent).

Comparative Example 2

A secondary battery in Comparative Example 2 was produced in the same manner as that in Example 1, except that the sealing member containing EPDM was used as the sealing member layer A (i.e., the sealing member layers A and B each contain EPDM as the main constituent).

Each battery of Examples and Comparative Examples was subjected to a high-temperature storage test and a drop test in the manner described below. The evaluation results are summarized in Table 1.

[High-Temperature Storage Test]

Each battery was charged with the constant current and the constant voltage to the fully charged state (battery voltage 4.1 V) under the condition of 2300 mA-4.1 V, cut off 46 mA. Thereafter, each battery was left for 120 days in a thermostatic chamber at a temperature of 60° C. and a humidity of 90%. Then, each battery was disassembled in a dry room, and each electrolyte solution was collected. A pH indicator strip was immersed in the collected electrolyte solution to measure pH in accordance with color change. The more the moisture that enters from the outside reacts with the electrolyte solution, the more acidic the electrolyte solution becomes. This measurement evaluates the sealing performance of the sealing structure.

[Drop Test]

A test in which each battery was discharged with a constant current under a condition of 1150 mA-3 V and was dropped from a height of 1.65 m was performed. One dropping set includes dropping with the sealing body facing upward, facing downward, and facing sideways. The batteries were compared with each other in accordance with the numbers of sets performed until leakage occurred. The occurrence of the leakage was visually evaluated. The numbers of times in FIG. 1 are denoted by numerical values relative to 100, which is the number of sets performed until leakage occurred in the battery of Comparative Example 1.

TABLE 1

|  | Example 1 | Example 2 | Comparative Example 1 | Comparative Example 2 |
|---|---|---|---|---|
| Sealing member layer A | BR | EPDM | BR | EPDM |

TABLE 1-continued

|  | Example 1 | Example 2 | Comparative Example 1 | Comparative Example 2 |
|---|---|---|---|---|
| Sealing member layer B | EPDM | BR | BR | EPDM |
| High-temperature storage test (pH) | 5 | 5 | 1 | 5 |
| Drop test (number of times) | 107 | 100 | 100 | 62 |

As shown in Table 1, the battery of Comparative Example 1 shows a good result in the drop test; however, the electrolyte solution becomes highly acidic after the long-term, high-temperature storage. From such a result, it is inferred that in the long-term, high-temperature and high-humidity environment, BR reacts with compounds, such as FEC or HF, thereby degrading sealing performance and thus, a considerable amount of moisture entered the battery. In the battery of Comparative Example 2, the electrolyte solution had a pH of 5, which is weakly acidic, after the long-term, high-temperature storage. From such a result, it is inferred that ingress of moisture is much more suppressed than that in Comparative Example 1, and it has been found that EPDM has a stronger resistance to compounds, such as FEC and HF, than BR does. On the other hand, the indicator indicating dropping resistance is 62 and worse than that of the battery of Comparative Example 1. A probable reason is that EPDM has lower rebound resilience than BR and thus cannot follow instantaneous deformation.

In contrast, in each of the batteries of Examples, the electrolyte solution had a pH of 5, which was the same as that of the battery of Comparative Example 2, after the long-term, high-temperature storage. Furthermore, each indicator indicating dropping resistance was 100 or higher. In other words, the sealing structure in which BR and EPDM are stacked on each other exhibits high dropping resistance and high electrolyte solution resistance.

The structure of the sealing member in each Example exhibits significant effects when the electrolyte solution contains FEC. When the electrolyte solution does not contain FEC, sealing performance of the battery case having such a sealing structure is also unlikely to be degraded, thereby prolonging the battery life. When urethane rubber, silicone rubber, chloroprene rubber, or isoprene rubber is used instead of BR, or when ethylene propylene rubber or fluoro rubber is used instead of EPDM, the effects exhibited in Examples are also expected.

REFERENCE SIGNS LIST 10 nonaqueous electrolyte secondary battery
11 positive electrode
12 negative electrode
13 separator
14 electrode body
15 battery case
16 outer can
17 sealing body
18, 19 insulating plate
20 positive electrode lead
21 negative electrode lead
22 groove portion
23 filter
24 lower valve body
25 insulation member
26 upper valve body
27 cap
28 gasket
30, 33 sealing member
31 first sealing member layer
32 second sealing member layer

The invention claimed is:

1. A nonaqueous electrolyte secondary battery comprising a closed-end cylindrical outer can, a sealing body that closes an opening of the outer can, a resin gasket disposed between the outer can and the sealing body, a sealing member interposed between the outer can and the gasket, and a nonaqueous electrolyte,
wherein the sealing member has a multilayer structure including:
a first sealing member layer, a main constituent of which is one selected from butadiene rubber, urethane rubber, silicone rubber, chloroprene rubber, and isoprene rubber and
a second sealing member layer, a main constituent of which is one selected from ethylene propylene rubber, ethylene propylene diene rubber, and fluoro rubber.

2. The nonaqueous electrolyte secondary battery according to claim 1,
wherein the main constituent of the first sealing member layer is butadiene rubber, and
the main constituent of the second sealing member layer is ethylene propylene diene rubber.

3. The nonaqueous electrolyte secondary battery according to claim 1, wherein the sealing member has a multilayer structure in which the first sealing member layer and the second sealing member layer are sequentially disposed from an outer-can side.

4. The nonaqueous electrolyte secondary battery according to claim 1, wherein the sealing member has a multilayer structure in which the second sealing member layer and the first sealing member layer are sequentially disposed from an outer-can side.

5. The nonaqueous electrolyte secondary battery according to claim 1,
wherein, regarding a surface of the first sealing member layer, an entire surface on which the second sealing member layer is stacked is covered with the second sealing member layer.

6. The nonaqueous electrolyte secondary battery according to claim 1, wherein the nonaqueous electrolyte contains at least fluoroethylene carbonate.

* * * * *